United States Patent
Jung et al.

(10) Patent No.: US 7,397,746 B2
(45) Date of Patent: Jul. 8, 2008

(54) METHOD AND DEVICE FOR CONTROLLING BEGINNING POINT OF OPTICAL PICK-UP UNIT

(75) Inventors: In Su Jung, Kyunggi-do (KR); Kwan Jun Park, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 520 days.

(21) Appl. No.: 10/684,448

(22) Filed: Oct. 15, 2003

(65) Prior Publication Data

US 2004/0081037 A1 Apr. 29, 2004

(30) Foreign Application Priority Data

Oct. 15, 2002 (KR) ............... 10-2002-0062936
Nov. 20, 2002 (KR) ............... 10-2002-0072511

(51) Int. Cl.
*G11B 7/00* (2006.01)
(52) U.S. Cl. ............... 369/53.22; 369/53.28; 369/53.24
(58) Field of Classification Search ............... None
See application file for complete search history.

(56) References Cited

U.S. PATENT DOCUMENTS

| | | | | |
|---|---|---|---|---|
| 5,173,887 A * | 12/1992 | Aoyagi et al. | ............ | 369/30.1 |
| 5,438,557 A * | 8/1995 | Ito et al. | ............ | 369/44.32 |
| 5,608,702 A * | 3/1997 | Yano et al. | ............ | 369/53.22 |
| 5,661,705 A * | 8/1997 | Kunikata et al. | ............ | 369/44.28 |
| 5,696,744 A * | 12/1997 | Okamoto et al. | ............ | 369/53.22 |
| 5,974,013 A * | 10/1999 | Kadono | ............ | 369/47.49 |
| 6,449,222 B2 * | 9/2002 | Ishihara | ............ | 369/30.1 |
| 6,678,221 B2 * | 1/2004 | Fujimoto | ............ | 369/44.29 |
| 2002/0101793 A1 * | 8/2002 | Sakata | ............ | 369/30.13 |

* cited by examiner

*Primary Examiner*—William Korzuch
*Assistant Examiner*—Christopher R Lamb
(74) *Attorney, Agent, or Firm*—Birch, Stewart, Kolasch & Birch, LLP

(57) ABSTRACT

A method and device are provided for controlling a beginning point of an optical pick-up unit. The optical pick-up unit moves to a beginning point of an optical disc such as a DVD (Digital Versatile Disc) to execute a servo-tuning function at the beginning point. The method includes a) performing a focus search operation on an optical disc and at the same time determining whether there is a reflection signal from the optical disc; b) after performing the focus search operation, moving the optical pick-up unit toward a predetermined beginning point of the optical disc based on the result of the determining step; and c) based on the reflection signal from the optical disc, determining whether or not the optical pick-up unit has moved to the beginning point of the optical disc while the optical pick-up unit is in motion.

16 Claims, 9 Drawing Sheets

METHOD AND DEVICE FOR CONTROLLING BEGINNING POINT OF OPTICAL PICK-UP UNIT

The present application claims, under 35 U.S.C. § 119, the priority benefit of Korean Patent Application No. 2002-62936 filed Oct. 15, 2002 and Korean Patent Application No. 2002-72511 filed Nov. 20, 2002, the entire contents of which are herein fully incorporated by reference.

BACKGROUND OF THE INVENTION

1. Field of the Invention

The present invention relates to a method and device for controlling a beginning point of an optical pick-up unit, and more particularly to a method and device for moving the optical pick-up unit to a beginning point of an optical disc such as a DVD (Digital Versatile Disc) in order to execute a servo-tuning function.

2. Description of the Related Art

Figure 1:
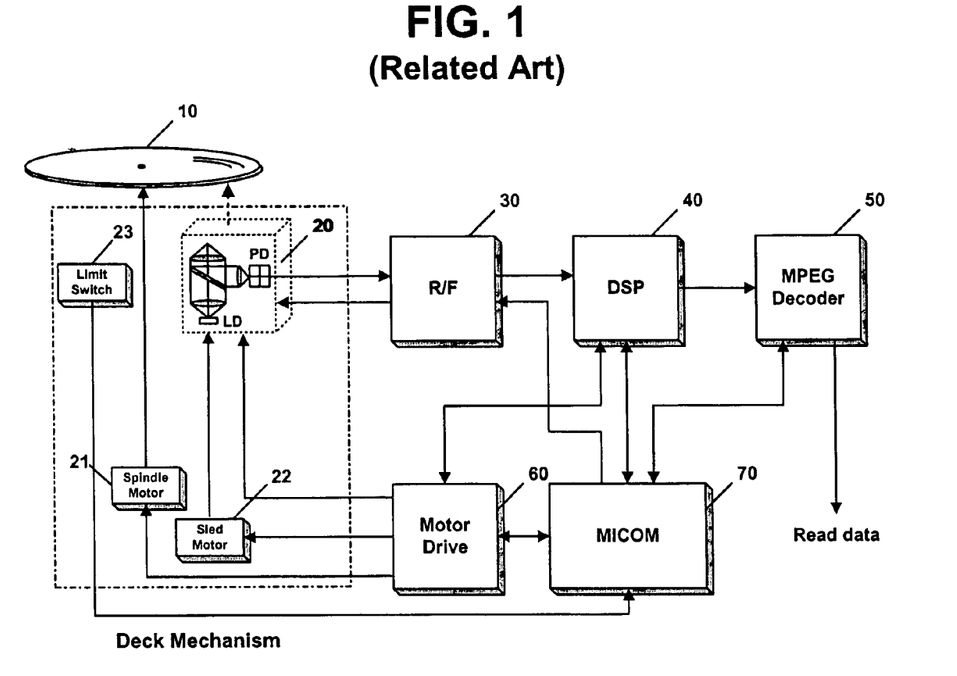
FIG. 1 is a block diagram of a conventional optical disc driver.

FIG. 1 is a block diagram of a conventional optical disc driver such as a DVD player. Referring to FIG. 1, the conventional DVD player includes an optical pick-up unit 20 for reading/writing data from/to an optical disc 10 such as a DVD, a spindle motor 21 for rotating the disc 10, a sled motor 22 for moving the optical pick-up unit 20 to an inner or outer portion of the disc 10, a limit switch 23 for generating a low signal L when the optical pick-up unit 20 moves to the innermost data track of the disc 10, a RF unit 30 for filtering an output signal of the optical pick-up unit 20 to create a binary signal, and a DSP (Digital Signal Processor) 40 for restoring the binary signal to original data according to its own clock being phase-locked with the binary signal.

The conventional DVD player further includes an MPEG decoder 50 for decoding the restored data generated from the DSP 40 according to an MPEG scheme, a motor drive 60 for applying a proper drive voltage to the spindle motor 21 and the sled motor 22, rotating the disc 10 and sliding the optical pick-up unit 20, and a microcomputer 70 for determining a current position of the optical pick-up unit 20 based on an output signal from the limit switch 23, and performing a servo-tuning operation.

Typically, if the disc 10 is inserted into the DVD player shown in FIG. 1, the microcomputer 70 executes a servo-tuning function to read the disc 10. In this case, the microcomputer 70 controls the optical pick-up unit 20 to be located at an innermost data track (also called a beginning point) of the disc 10, and then executes a servo-tuning operation. However, since the microcomputer 70 is unable to recognize a current position of the optical pick-up unit 20 before reading the disc 10, it firstly moves the optical pick-up unit 20 to the beginning point (i.e., the innermost data track) of the disc 10 prior to executing the servo-tuning operation. This operation will hereinafter be described in more detail.

If the disc 10 is inserted into the DVD player, the microcomputer 70 applies a proper drive voltage to the sled motor 22, and moves the optical pick-up unit 20 to the beginning point (i.e., innermost data track) of the disc 10. In this case, the limit switch 23 outputs the signal L when the optical pick-up unit 20 is placed at the innermost data track of the disc 10, such that the microcomputer 70 continuously checks the output signal of the limit switch 23 while the optical pick-up unit 20 is in motion in order to determine whether the optical pick-up unit 20 has been moved to the innermost data track.

When the optical pick-up unit 20 finally moves to the innermost data track, the microcomputer 70 executes a prescribed servo-tuning operation.

However, the aforementioned conventional DVD player must adapt an additional limit switch to determine whether the optical pick-up unit 20 has been moved to the innermost data track of the disc 10, resulting in the increase of size and cost of the DVD player.

SUMMARY OF THE INVENTION

Therefore, the present invention has been made in view of the above problems.

It is an object of the present invention to provide a method and device for controlling a beginning point of an optical pick-up unit in order to move the optical pick-up unit to a beginning point of an optical disc without using an additional component such as a limit switch, such that it performs a servo-tuning operation at the innermost data track of the optical disc.

In accordance with one aspect of the present invention, the above and other objects can be accomplished by the provision of a method for comprising the steps of: a) performing a focus search operation on an optical disc and at the same time determining whether there is a reflection signal from the optical disc; b) after performing the focus search operation, moving the optical pick-up unit toward a predetermined beginning point of the optical disc based on the result of the determining step; and c) based on the reflection signal from the optical disc, determining whether or not the optical pick-up unit has moved to the beginning point of the optical disc while the optical pick-up unit is in motion.

In accordance with another aspect of the present invention, there is provided a method for controlling movement of an optical pick-up unit, comprising the steps of: a) moving the optical pick-up unit toward a target position of an optical disc; b) while the optical pick-up unit is in motion, detecting a load voltage of a driver for moving the optical pick-up unit and detecting a counted value of the driver's output pulses generated as the driver is activated; and c) determining whether the optical pick-up unit having been moved is positioned at a beginning point of the optical disc on the basis of a current load voltage of the driver and the counted value of the drive's output pulses.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

Figure 2:
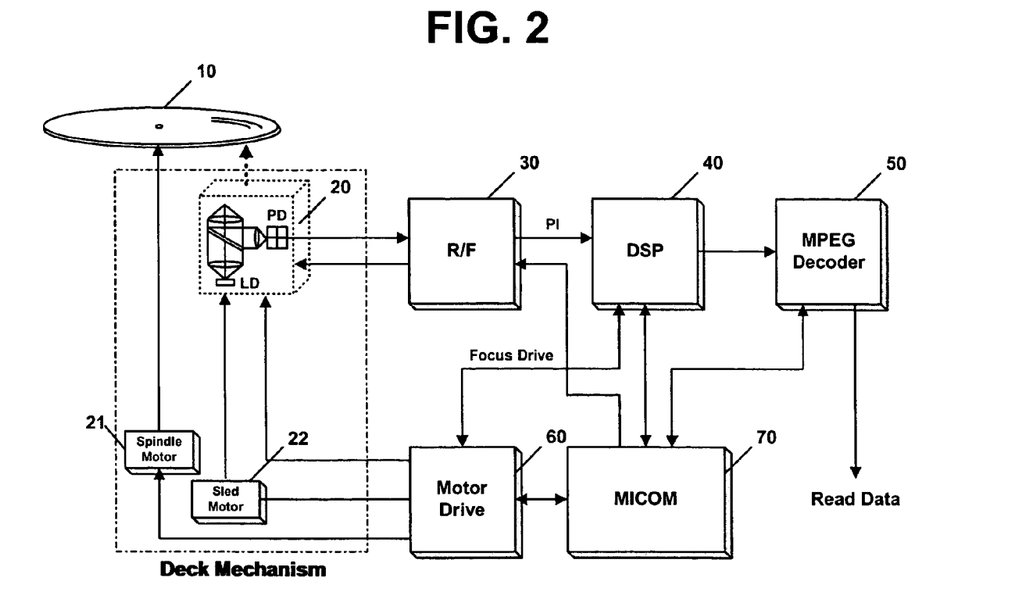
FIG. 2 is a block diagram of an optical disc driver to which a method for controlling a beginning point of an optical pick-up unit in accordance with a first preferred embodiment of the present invention is applied.

FIG. 2 is a block diagram of an optical disc driver to which a method for controlling a beginning point of an optical pick-up unit in accordance with a first preferred embodiment of the present invention is applied. In comparison with the conventional optical disc driver, the optical disc driver shown in FIG. 2 does not include a limit switch whereas the conventional optical disc driver includes the limit switch 23. But the remaining components of the present disc driver, other than the limit switch, are the same as those of the conventional DVD player shown in FIG. 1. All the components of the optical disc driver in FIG. 2 are operatively coupled. The methods of the present invention are also applicable to other types of disc drivers.

Figure 4A:
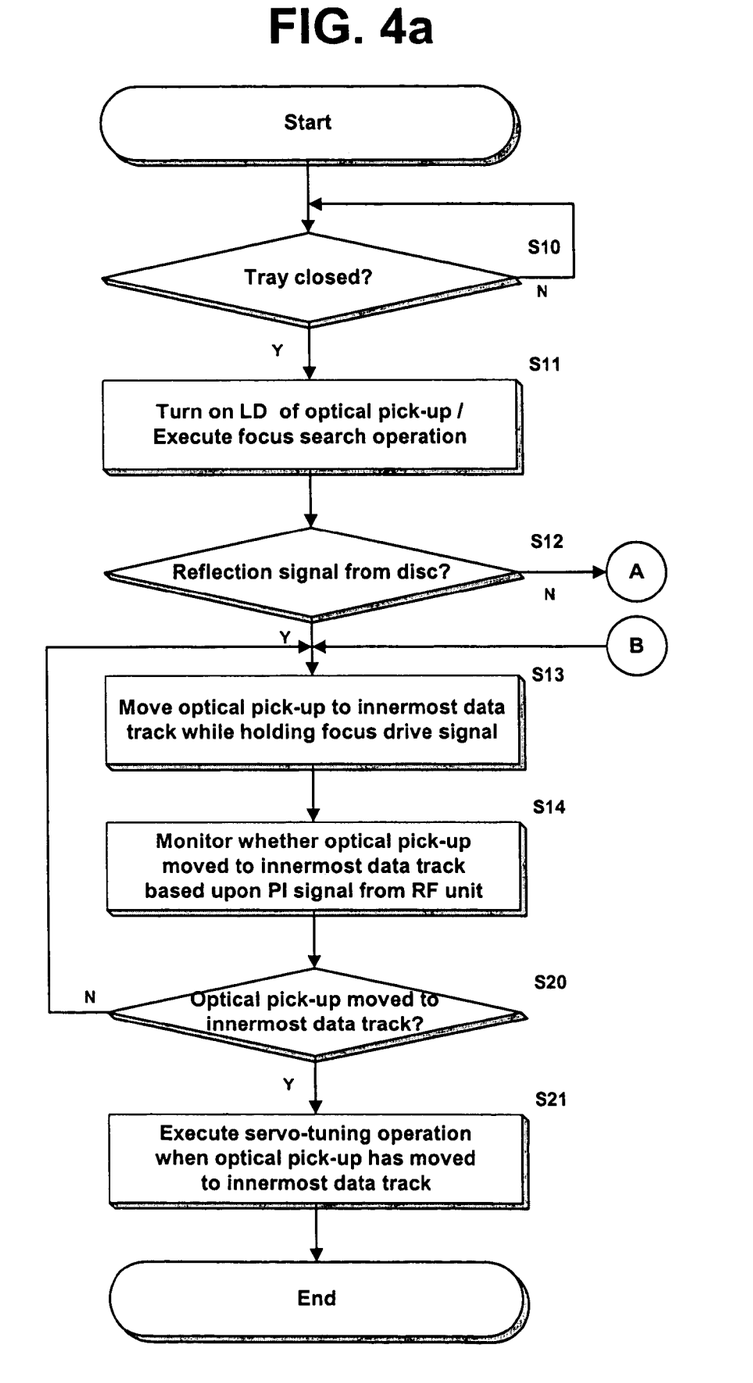
FIGS. 4a and 4b are flow charts illustrating a method for controlling a beginning point of an optical pick-up unit in accordance with the first preferred embodiment of the present invention.
Figure 4B:
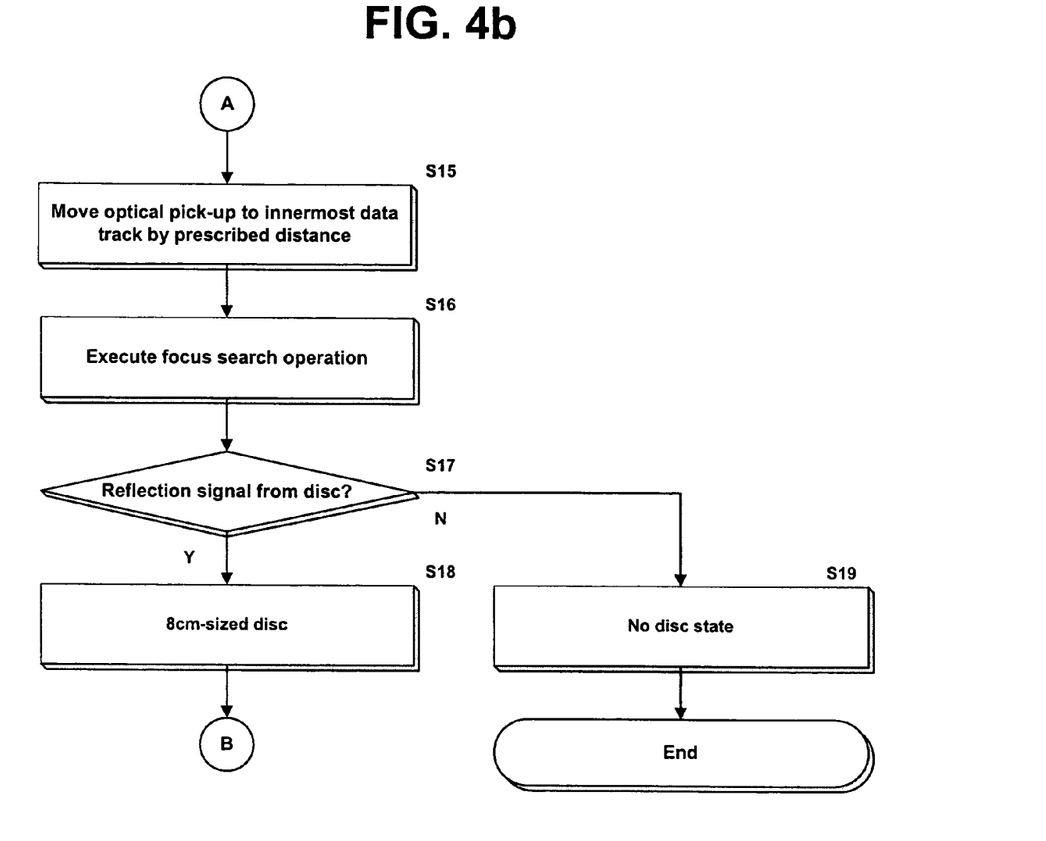

FIGS. 4a and 4b are flow charts illustrating a method for controlling a beginning point of an optical pick-up unit in accordance with the first preferred embodiment of the present invention. The method shown in FIGS. 4a-4b will hereinafter be described in more detail with reference to FIG. 2.

First, if a tray with a disc 10 is inserted into an optical disc (e.g., as shown in FIG. 2) driver at step S10, a microcomputer 70 applies a proper voltage to an LD (Laser Diode) (or other light source) of an optical pick-up unit 20 over an RF unit 30, such that the LD is turned on. An objective lens of the optical pick-up unit 20 performs a focus search function to focus on a signal surface (i.e., recording surface) of the disc 10 at step S11, and it is determined at step S12 whether there is a reflection signal from the disc 10.

If it is determined at step S12 that there is the reflection signal from the disc 10, that is, if a focus servo is switched on, the microcomputer 70 performs a beginning point control function to execute a servo-tuning operation on the disc 10 inserted into the optical disc driver. For this purpose, the microcomputer 70 moves the optical pick-up unit 20 to the innermost data track being a beginning point on the disc 10 while the DSP 40 holds a focus drive signal applied to the motor drive 60 at step S13.

Figure 3:
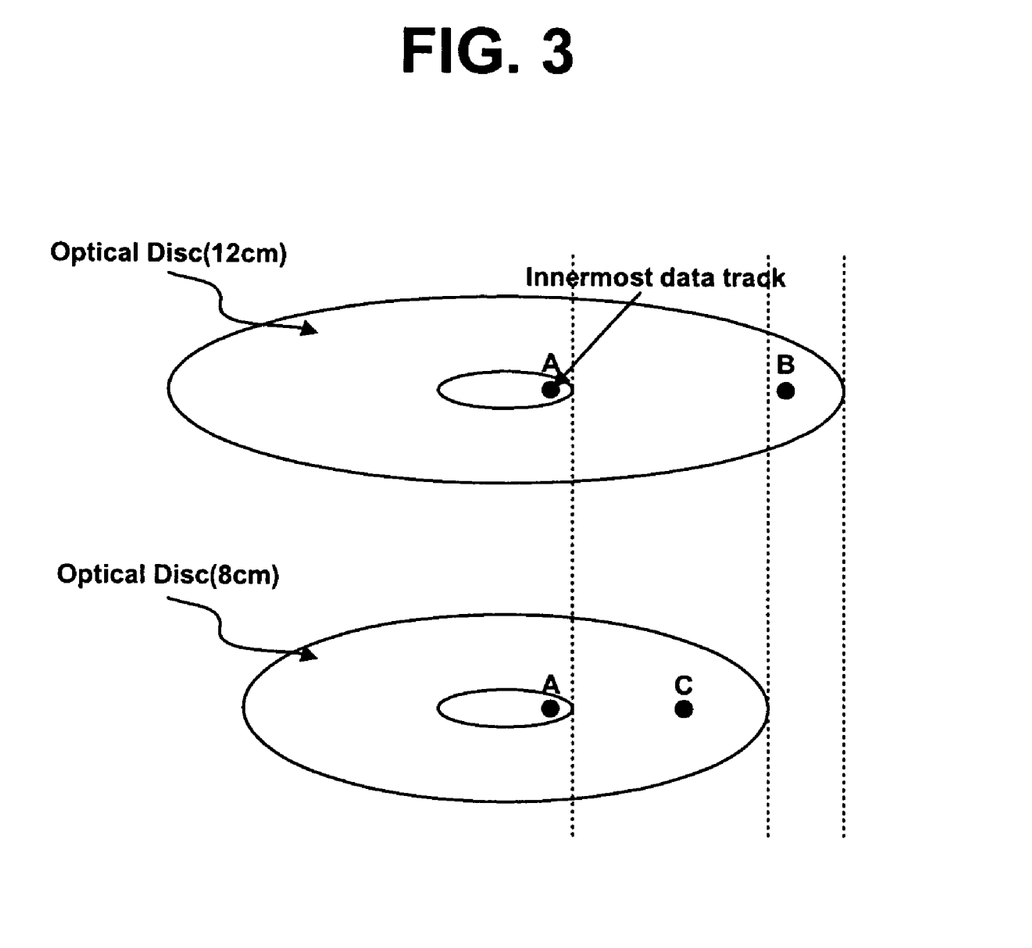
FIG. 3 is an exemplary view illustrating an initial position B of an unmoved optical pick-up unit and an innermost data track A of a disc.

Generally, as shown in FIG. 3, in the case of inserting the disc 10 into the optical disc driver, the optical pick-up unit 20 is positioned at a random point B between the innermost data track A and an outermost data track of the disc 10. Therefore, considering this situation, the microcomputer 70 applies a certain proper drive voltage to the sled motor 22 through the motor drive 60, to move the optical pick-up unit 20 according to the applied drive voltage from the beginning point B towards the innermost data track A of the disc 10 having a diameter of 12 cm at step S13.

While the optical pick-up unit 20 is in motion, the microcomputer 70 determines whether the optical pick-up unit 20 is currently positioned at the innermost data track of the disc 10 on the basis of the reflection signal from the disc 10, and this determination process will hereinafter be described in detail.

While the optical pick-up unit 20 is in motion, the microcomputer 70 continuously checks a PI (Pull In Error) signal (or an AS signal) generated from the RF unit 30 receiving the reflection signal from the disc 10 at step S14. In this case, the PI signal is generated by the RF unit 30 converting an optical signal from the optical pick-up unit 20 into a DC value.

If the optical pick-up unit 20 is positioned at the innermost data track of the disc 10 while the focus servo is switched on, the level of the PI signal (or an AS signal) drops down to less than a predetermined level. If this happens, the microcomputer 70 determines that the optical pick-up unit 20 has moved to the innermost data track of the disc 10 at step S20. Otherwise, the process repeats steps S13, S14 and S20 until the optical pick-up unit 20 is moved to the innermost data track of the disc 10.

In this way, if it is determined at step S20 that the optical pick-up unit 20 has moved to the innermost data track of the disc 10, the microcomputer 70 stops the above beginning point control operation, and performs a servo-tuning operation at step S21. Therefore, a normal operation such as reading the disc 10 can be performed.

In addition, the microcomputer 70 is able to determine the type of the inserted disc 10. For example, in the case where a disc with a diameter of 8 cm is inserted into the optical disc driver and a beginning point B of the optical pick-up unit 20 is set to be outside of the perimeter of a general disc with a diameter of 8 cm as shown in FIG. 3, the microcomputer 70 is able to determine the type of the inserted disc upon receiving the reflection signal from the disc.

Figure 5:
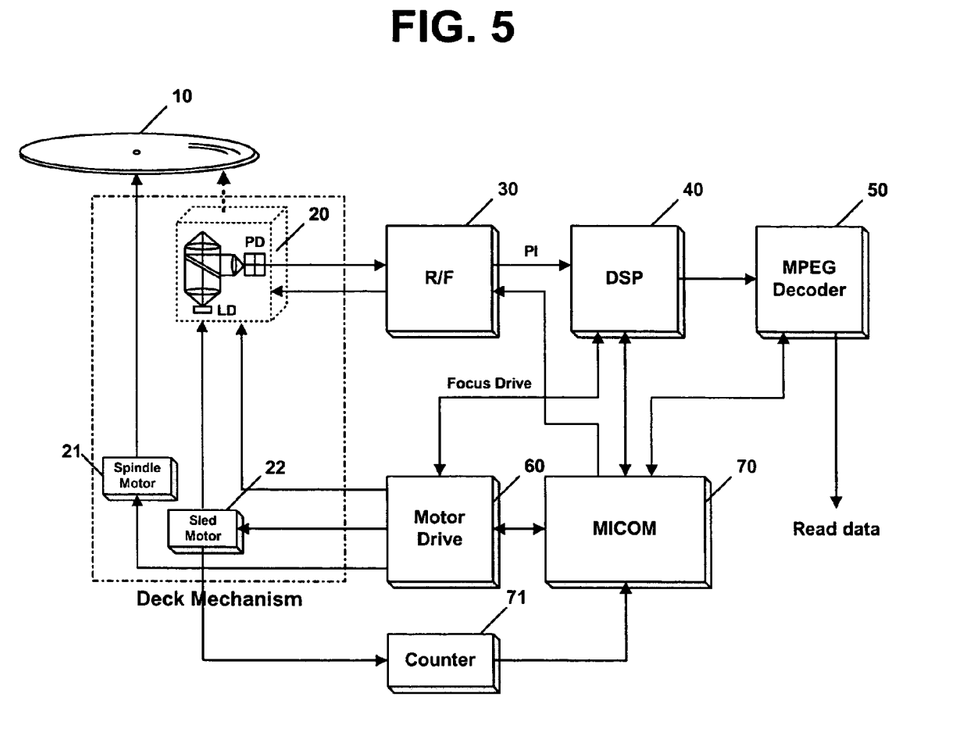
FIG. 5 is a block diagram of an optical disc driver to which a method for controlling a beginning point of an optical pick-up unit in accordance with a second preferred embodiment of the present invention is applied.

For instance, if a disc 10 is inserted into the optical disc driver at step S10, the microcomputer 70 performs a focus search operation at the set beginning point B of the optical pick-up unit 20 at step S11. In this case, if the inserted disc 10 is not a disc with a diameter of 12 cm or if the inserted disc 10 has a diameter greater than at least 8 cm, there will be no reflection signal at the point B at step S12. Then, the microcomputer 70 determines that the optical pick-up unit 20 is currently outside of a disc having a diameter of 8 cm and the inserted disc 10 has a diameter of 8 cm. In order to confirm this determination, the microcomputer 70 moves the optical pick-up unit 20 by a prescribed distance in such a way that the optical pick-up unit 20 is positioned over or in the vicinity of a point C for an 8 cm-diameter disc as shown in FIG. 3 at step S15. Herein, a division of a method for controlling a beginning point of the optical pick-up unit 20 in accordance with another preferred embodiment of the present invention to be explained below can be adapted to step S15. That is, the optical pick-up unit 20 can move by the prescribed distance by executing step S30 to S40 of FIG. 8. In this case, a counter 71 as shown in FIG. 5 would be needed, which will be discussed later.

After step S15, the microcomputer 70 re-executes the above focus search operation at step S16 while the optical pick-up unit 20 is in the vicinity of the point C of the disc 10, and determines whether there is a reflection signal from the disc 10 at step S17. In the case where there is the reflection signal from the disc 10 and the focus servo is turned on while the microcomputer 70 executes the focus search operation, the microcomputer 70 determines that the inserted disc 10 has a diameter of 8 cm at step S18. Then, in the case where the focus servo is turned on, the process returns to step S13 wherein the microcomputer 70 moves the optical pick-up unit 20 to the innermost data track A of the 8 cm-sized disc 10 in order to perform a servo tuning operation at step S13.

In the case where there is no reflection signal from the disc 10 while the microcomputer 70 executes the focus search operation, the microcomputer 70 determines that the disc is not inserted into the optical disc driver at step S19, and thereby terminates a program.

Although the process of determining the type of an inserted disc has been discussed above for discriminating between a disc having a 12 cm diameter and a disc having an 8 cm diameter, the present invention encompasses discriminating between discs having other diameters. This can be accomplished by setting the point B and any additional points based on such disc sizes. For instance, to discriminate between a disc of 12 cm diameter and a disc of 10 cm diameter, the point B of FIG. 3 can be set to be outside of the range of a general disc with the 10 cm diameter.

A method for controlling a beginning point of the optical pick-up unit 20 in accordance with a second preferred embodiment of the present invention will hereinafter be described with reference to FIGS. 5 to 8, in which the microcomputer 70 determines conditionally or periodically whether the optical pick-up unit 20 has reached the innermost data track of the disc 10 while the optical pick-up unit 20 is being moved toward the target position (e.g., innermost data track) of the disc 10.

FIG. 5 is a block diagram of an optical disc driver to which a method for controlling a beginning point of the optical pick-up unit 20 in accordance with the second preferred embodiment of the present invention is applied. In comparison with the conventional DVD player shown in FIG. 1, the optical disc driver shown in FIG. 5 does not include a limit switch whereas the conventional optical disc driver includes the limit switch 23. But, the driver of FIG. 5 includes a counter 71 for counting output pulses (e.g., step pulses) of the sled motor 22 while rotating the sled motor 22. The remaining components of the driver in FIG. 5, other than the limit switch, are the same as those of FIG. 1. All the components of the optical disc driver in FIG. 5 are operatively coupled.

Figure 6:
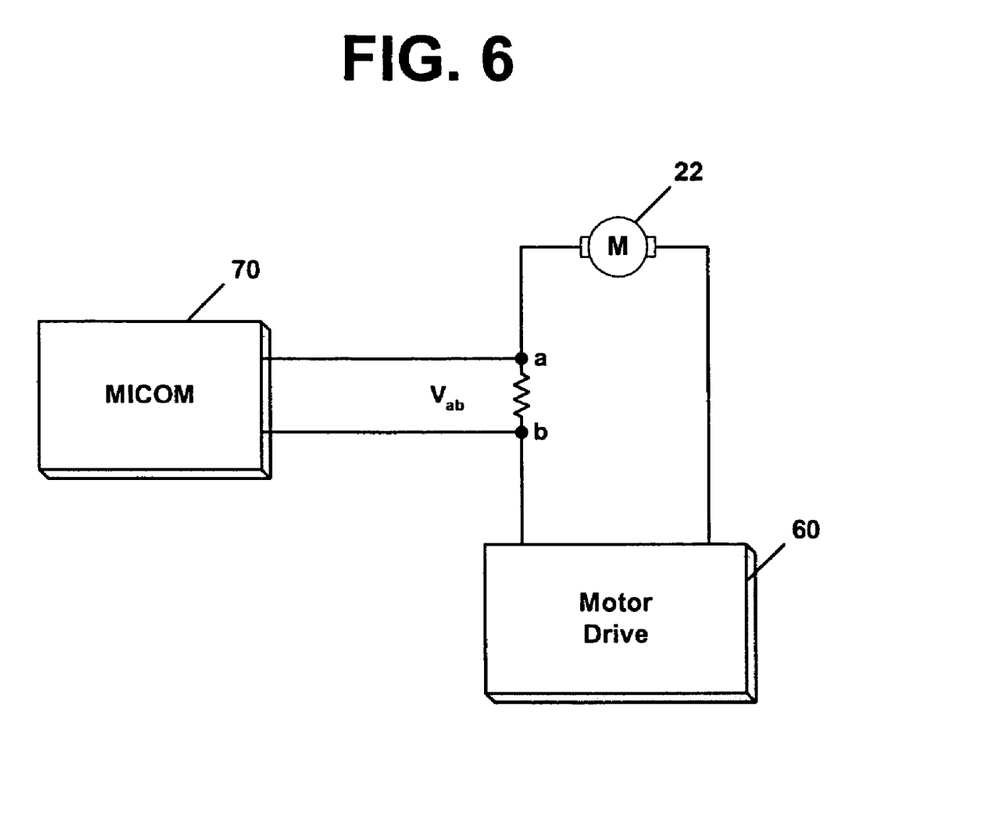
FIG. 6 is an exemplary view illustrating a block diagram of a sled motor drive using a microcomputer and a motor drive in accordance with the second preferred embodiment of the present invention.
Figure 7:
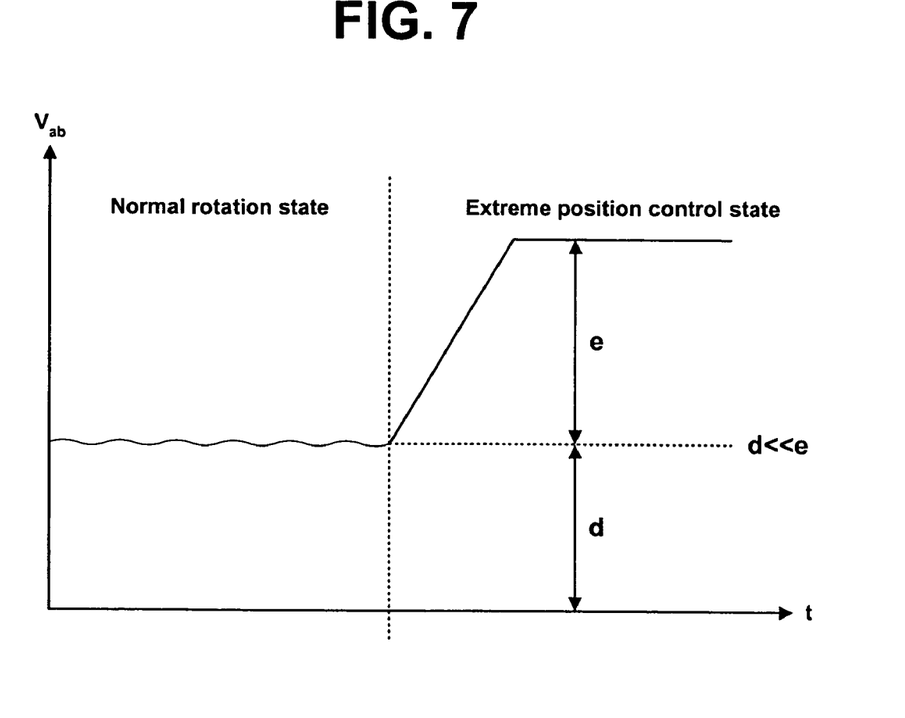
FIG. 7 is an exemplary graph illustrating the difference between a load voltage of a sled motor at a normal rotation state and a load voltage of the sled motor at an extreme position control state.

FIG. 6 is an exemplary view illustrating a block diagram of a sled motor drive 22 using the microcomputer 70 and a motor drive 60 in FIG. 5.

Figure 8:
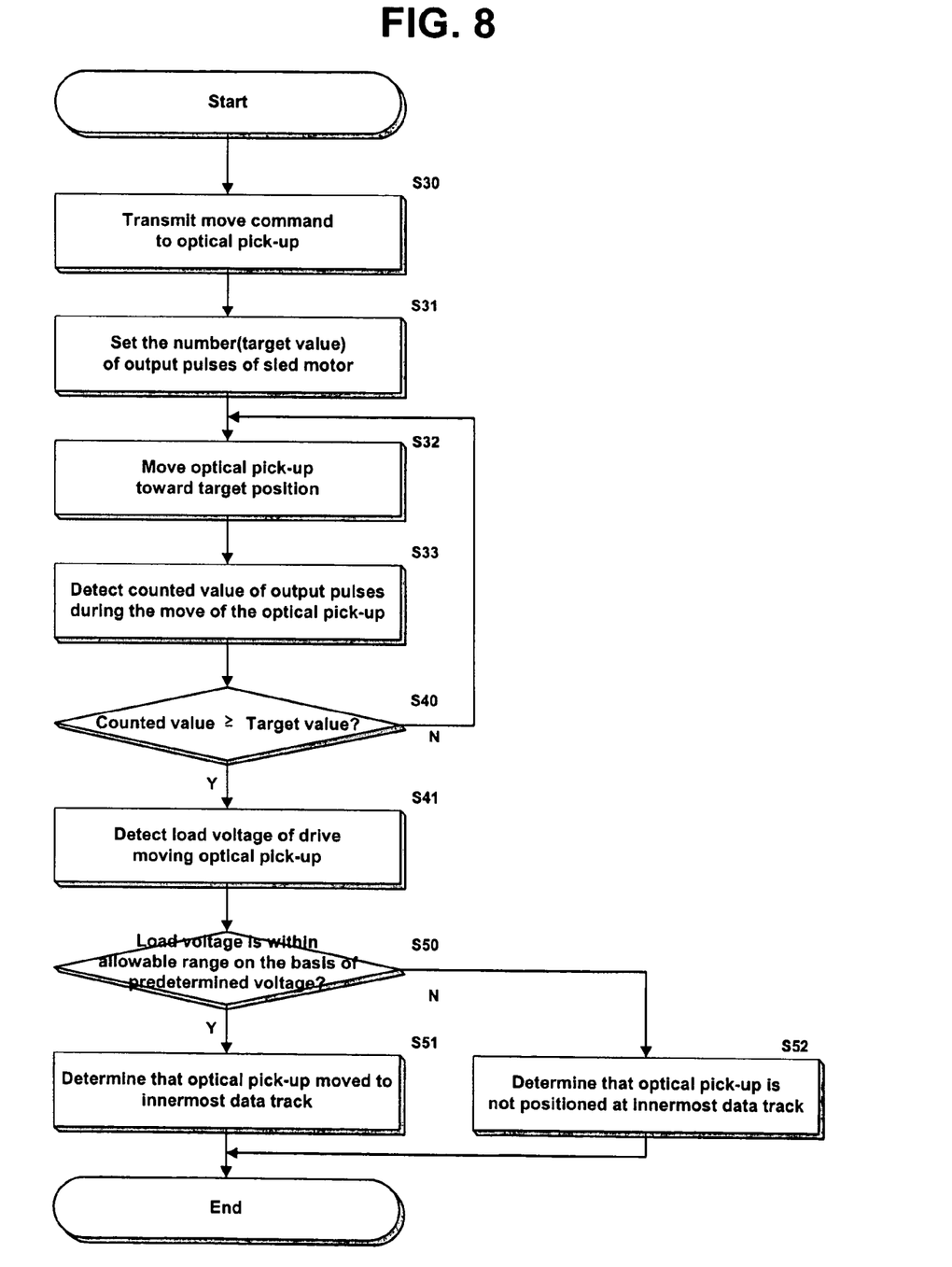
FIG. 8 is a flow chart illustrating a method for controlling a beginning point of an optical pick-up unit in accordance with the second preferred embodiment of the present invention.

FIG. 8 is a flow chart illustrating a method for controlling a beginning point of an optical pick-up unit in accordance with the second preferred embodiment of the present invention. The method shown in FIG. 8 will hereinafter be described with reference to FIGS. 5 and 6.

First, provided that a distance by which the optical pick-up unit 20 is to move is predetermined to reach the target position such as the innermost data track of the inserted disc, the microcomputer 70 controls the optical pick-up unit 20 to move by this distance when a disc is inserted, and at the same time experimentally sets up the number (target value) of output pulses for the sled motor 22. Then, number (n) of output pulses (i.e., step pulses generated by the rotation of the motor 22) from the sled motor 22 is counted as the sled motor 22 rotates to move the pick-up unit 20 until the optical pick-up unit 20 moves by the predetermined distance, i.e., when the counted output pulse number reaches the target output pulse number.

More specifically, referring to FIG. 8, when a desired moving distance of the optical pick-up unit 20 is predetermined and a moving command are set up at step S30, the microcomputer 70 sets up the desired number 'm' (target value) of output pulses for the sled motor 22 at step S31 according to the predetermined moving distance. Thereafter, as shown in FIG. 6, the microcomputer 70 applies a proper drive voltage to the sled motor 22 through the motor drive 60, rotates the sled motor 22, and thus begins moving the optical pick-up unit 20 from a current position toward a target position (e.g., innermost data track) at step S32. While the optical pick-up unit 20 is in motion, the counter 71 counts the number of output pulses (i.e., step pulses) generated by the rotation of the sled motor 22 at step S33, and transmits the counted number 'n' to the microcomputer 70. Therefore, the microcomputer 70 continuously detects the counted number and compares this counted number with the predetermined target number 'm' at step S40, and continuously moves the optical pick-up unit 20 until the counted number 'n' reaches (or exceeds) the predetermined target number 'm'. In this case, if the optical pick-up unit 20 is close to the innermost data track of the disc 10, the load voltage of the sled motor 22 will abruptly increase. In more detail, in the case of an extreme position control state shown in FIG. 7 (such as being positioned at the innermost data track of the disc), the load voltage of the sled motor 22 increases from a load voltage 'd' in a normal rotation state to a prescribed voltage 'd+e'. This 'd+e' voltage (or the allowable range for this abrupt increase in the load voltage from the normal rotation state) can be experimentally determined in advance, and is used at step S50 as a prescribed (reference) load voltage (or voltage range) indicative that the pick-up unit 20 has reached the innermost data track of the inserted disc.

That is, if it is determined at step S40 that the counted number 'n' is beyond the predetermined target number 'm', the microcomputer 70 detects a load voltage of the sled motor 22 at step S41, and compares the detected load voltage with the prescribed load voltage discussed above. If it is determined at step S50 whether the detected load voltage is in a predetermined allowable range on the basis of the prescribed value, the microcomputer 70 determines that the optical pick-up unit 20 has been moved to the innermost data track of the disc 10 at step S51. But, if it is determined at step S50 that the load voltage is not in the predetermined allowable range on the basis of the prescribed value, the microcomputer 70 determines that the optical pick-up unit 20 is not currently positioned at the innermost data track of the disc 10 at step S52. In this case, the process may end or the microcomputer 70 can apply a proper drive voltage to the sled motor 20 to continue to move the pick-up unit 20 until the pick-up unit 20 reaches the innermost data track. The load voltage can be checked continuously to determine whether or not the pick-up unit 20 has reached the innermost data track (e.g., steps S41 and S50 may be performed repeatedly). Other variations are possible.

After step S51, step S21 of FIG. 4a can be performed.

As apparent from the above description, a method for controlling a beginning point of an optical pick-up unit according to the present invention moves the optical pick-up unit to a beginning point (i.e., innermost data track) of a disc based on a reflection signal from the disc without using an additional limit switch, in such a way that it reduces the volume and cost of an optical disc driver, determines the type of the disc, and determines whether the disc is inserted into the optical disc driver.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling movement of an optical pick-up unit, comprising the steps of:
   a) performing a focus search operation on an optical disc and at the same time determining whether there is a reflection signal from the optical disc;
   b) after performing the focus search operation, moving the optical pick-up unit toward a predetermined beginning point of the optical disc based on the result of the determining step; and
   c) monitoring a level of an RF signal generated from the reflection signal from the optical disc and determining the optical pick-up unit has moved to the beginning point of the optical disc when the level of the RF signal is lower than a predetermined level, while the optical pick-up unit is in motion,
   wherein the beginning point of the optical disc is the innermost data track of all data tracks of the optical disc.

2. The method as set forth in claim 1, further comprising the step of:
   d) if the optical pick-up unit has moved to the beginning point of the optical disc, performing a servo-tuning operation.

3. The method as set forth in claim 1, wherein the optical disc is a DVD (digital versatile disc).

4. The method as set forth in claim 1, wherein the step (b) is executed when a focus drive signal is held.

5. The method as set forth in claim 1, wherein the step (c) determines whether the optical pick-up unit has moved to the beginning point of the optical disc based on a PI (Pull In Error) signal as the RF signal generated by an RF unit.

6. The method as set forth in claim 1, wherein the step (a) includes the steps of:
   a1) performing a focus search operation at a beginning point of the optical pick-up unit in association with the optical disc when the optical disc is inserted into an optical disc apparatus, and at the same time determining whether there is a reflection signal from the optical disc;
   a2) moving the optical pick-up unit by a prescribed distance on the basis of the result of the step (a1); and
   a3) performing a focus search operation for the optical disc at a position to which the optical pick-up unit moves, and at the same time redetermining whether there is a reflection signal from the optical disc.

7. The method as set forth in claim 6, wherein the step (a2) includes the steps of:
   a21) outputting a command for moving the optical pick-up unit by a prescribed distance, and at the same time setting up a target number, corresponding to the prescribed distance, of output pulses of a driver for moving the optical pick-up unit;
   a22) moving the optical pick-up unit, and detecting a counted value of the driver's output pulses generated while the optical pick-up unit is in motion; and
   a23) determining whether the optical pick-up unit has moved by the prescribed distance by comparing the counted value with the target value of the driver's output pulses.

8. The method as set forth in claim 1, further comprising the step of:
   (e) discriminating a type of the optical disc based on the reflection signal.

9. The method as set forth in claim 8, wherein the step (e) discriminates whether the optical disc is a 12 cm-sized disc or an 8 cm-sized disc.

10. A device for controlling movement of an optical pick-up unit, comprising:
    first means for performing a focus search operation on an optical disc the condition and at the same time determining whether there is a reflection signal from the optical disc;
    after performing the focus search operation, second means for moving the optical pick-up unit toward a predetermined beginning point of the optical disc based on the determining result; and
    third means for monitoring a level of an RF signal generated from the reflection signal from the optical disc and determining the optical pick-up unit has moved to the beginning point of the optical disc when the level of the RF signal is lower than a predetermined level, while the optical pick-up unit is in motions,
    wherein the beginning point of the optical disc is the innermost data track of all data tracks of the optical disc.

11. The device as set forth in claim 10, further comprising:
    fourth means for performing a servo-tuning operation if the optical pick-up unit has moved to the beginning point of the optical disc.

12. The device as set forth in claim 10, wherein the optical disc is a DVD (digital versatile disc).

13. The device as set forth in claim 10, wherein the third means determines whether the optical pick-up unit has moved to the beginning point of the optical disc based on a PI (Pull In Error) signal as the RF signal generated by an RF unit.

14. The device as set forth in claim 10, wherein the first means performs a focus search operation at a beginning point of the optical pick-up unit in association with the optical disc when the optical disc is inserted into an optical disc apparatus, and at the same time determines whether there is a reflection signal from the optical disc; moves the optical pick-up unit by a prescribed distance; and performs a focus search operation for the optical disc at a position to which the optical pick-up unit moves, and at the same time redetermine whether there is a reflection signal from the optical disc.

15. The device as set forth in claim 10, further comprising:
    fifth means for discriminating a type of the optical disc based on the reflection signal.

16. The device as set forth in claim 15, wherein the fifth means discriminates whether the optical disc is a 12 cm-sized disc or an 8 cm-sized disc.

* * * * *